US011097571B2

(12) United States Patent
Yamashita

(10) Patent No.: US 11,097,571 B2
(45) Date of Patent: Aug. 24, 2021

(54) TIRE

(71) Applicant: BRIDGESTONE CORPORATION, Tokyo (JP)

(72) Inventor: Hiromasa Yamashita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/850,535

(22) Filed: Apr. 16, 2020

(65) Prior Publication Data

US 2020/0238762 A1 Jul. 30, 2020

Related U.S. Application Data

(63) Continuation-in-part of application No. 16/069,212, filed as application No. PCT/JP2017/006338 on Feb. 21, 2017, now abandoned.

(30) Foreign Application Priority Data

Feb. 26, 2016 (JP) ............................ JP2016-035960

(51) Int. Cl.
*B60C 1/00* (2006.01)
*B60C 9/02* (2006.01)
*B60C 13/00* (2006.01)

(52) U.S. Cl.
CPC .................. *B60C 9/02* (2013.01); *B60C 1/00* (2013.01); *B60C 13/00* (2013.01); *B60C 2009/0269* (2013.01); *B60C 2013/005* (2013.01)

(58) Field of Classification Search
CPC ..... B60C 1/00; B60C 5/14; B29D 2030/0682; B32B 27/34; C08G 69/40
See application file for complete search history.

(56) References Cited

U.S. PATENT DOCUMENTS

| | | | | |
|---|---|---|---|---|
| 5,484,848 | A | 1/1996 | Jadamus et al. | |
| 2013/0192735 | A1* | 8/2013 | Jeong ................. | B29D 30/0681 152/510 |
| 2013/0206301 | A1 | 8/2013 | Fudemoto et al. | |
| 2016/0039973 | A1 | 2/2016 | Honjo et al. | |
| 2016/0046764 | A1 | 2/2016 | Fudemoto et al. | |
| 2016/0144671 | A1 | 5/2016 | Kouno et al. | |
| 2016/0303905 | A1 | 10/2016 | Fudemoto et al. | |

FOREIGN PATENT DOCUMENTS

| | | | |
|---|---|---|---|
| CN | 103189215 | A | 7/2013 |
| CN | 105189610 | A | 12/2015 |
| EP | 2980118 | A1 | 2/2016 |
| JP | 07-011013 | A | 1/1995 |
| JP | 2697084 | * | 1/1998 |
| JP | 2011-042774 | A | 3/2011 |
| JP | 2012-007074 | A | 1/2012 |
| JP | 2012-46021 | A | 3/2012 |
| JP | 2012-046030 | A | 3/2012 |
| JP | 2014-062259 | A | 4/2014 |
| JP | 2015-16808 | A | 1/2015 |
| WO | 2014/156740 | A1 | 10/2014 |
| WO | 2014/157558 | A1 | 10/2014 |

OTHER PUBLICATIONS

Communication dated Jan. 25, 2019, from European Patent Office in counterpart application No. 17756476.2.

Chinese Search Report of Office Action dated Feb. 3, 2020, issued by the State Intellectual Property Office of the P.R.C. in application No. 201780007846X.

International Search Report of PCT/JP2017/006338 dated Mar. 21, 2017.

Rath et al "Change in Fiber Properties Due to the Heat Treatment of Nylon 6 Tire Cords", Journal of Applied Polymer Science, vol. 108, 3960-3967 (2008), Published online Mar. 17, 2008.

Naskar et al "Studies on tyre cords: degradation of polyester due to fatigue", Polymer Degradation and Stability 83 (2004) 173-180, published on Jan. 2004.

* cited by examiner

*Primary Examiner* — Gregory Listvoyb
(74) *Attorney, Agent, or Firm* — Sughrue Mion, PLLC

(57) ABSTRACT

A tire having a tire frame, the tire frame comprising a thermoplastic elastomer as a resin material, and the thermoplastic elastomer having a value of orientation f, as measured by a small angle X-ray scattering method, of from −0.08 to 0.08.

1 Claim, 3 Drawing Sheets

TIRE

CROSS REFERENCE TO RELATED APPLICATIONS

This application is a Continuation-In-Part of U.S. application Ser. No. 16/069,212 filed Jul. 11, 2018, which is a National Stage of International Application No. PCT/JP2017/006338 filed Feb. 21, 2017, claiming priority based on Japanese Patent Application No. 2016-035960 filed Feb. 26, 2016. All publications, patent applications, and technical standards mentioned in this specification are herein incorporated by reference to the same extent as if each individual publication, patent application, or technical standard was specifically and individually indicated to be incorporated by reference.

TECHNICAL FIELD

The present disclosure relates to a tire.

BACKGROUND ART

In recent years, development of tires having a tire frame formed from a resin material, instead of conventional materials such as rubber, has been progressing, in view of reducing weight, ease of molding, ease of recycling and the like. For example, Japanese Patent Application Laid-Open (JP-A) No. 2012-46030 describes a tire having a tire frame formed using a polyamide thermoplastic elastomer as a resin material.

The condition of a tire frame produced from a resin material may be influenced by the state of the resin material after the production of the tire. Therefore, it is expected that the properties of the tire frame and the tire (such as durability) can be improved by controlling the state of the resin material. However, it remains to be determined how the state of the resin material should be controlled in order to achieve the desired properties.

In view of the above, the present disclosure aims to provide a tire that has a tire frame including a thermoplastic elastomer as a resin material, and that exhibits a superior durability.

Means for Implementing the Invention

A tire has a tire frame including a thermoplastic elastomer as a resin material, the thermoplastic elastomer having a value of orientation f, as measured by small angle X-ray scattering, of from −0.08 to 0.08.

Effect of the Invention

According to the disclosure, a tire that exhibits a superior durability is provided.

DESCRIPTION OF EMBODIMENTS

Figure 1A:
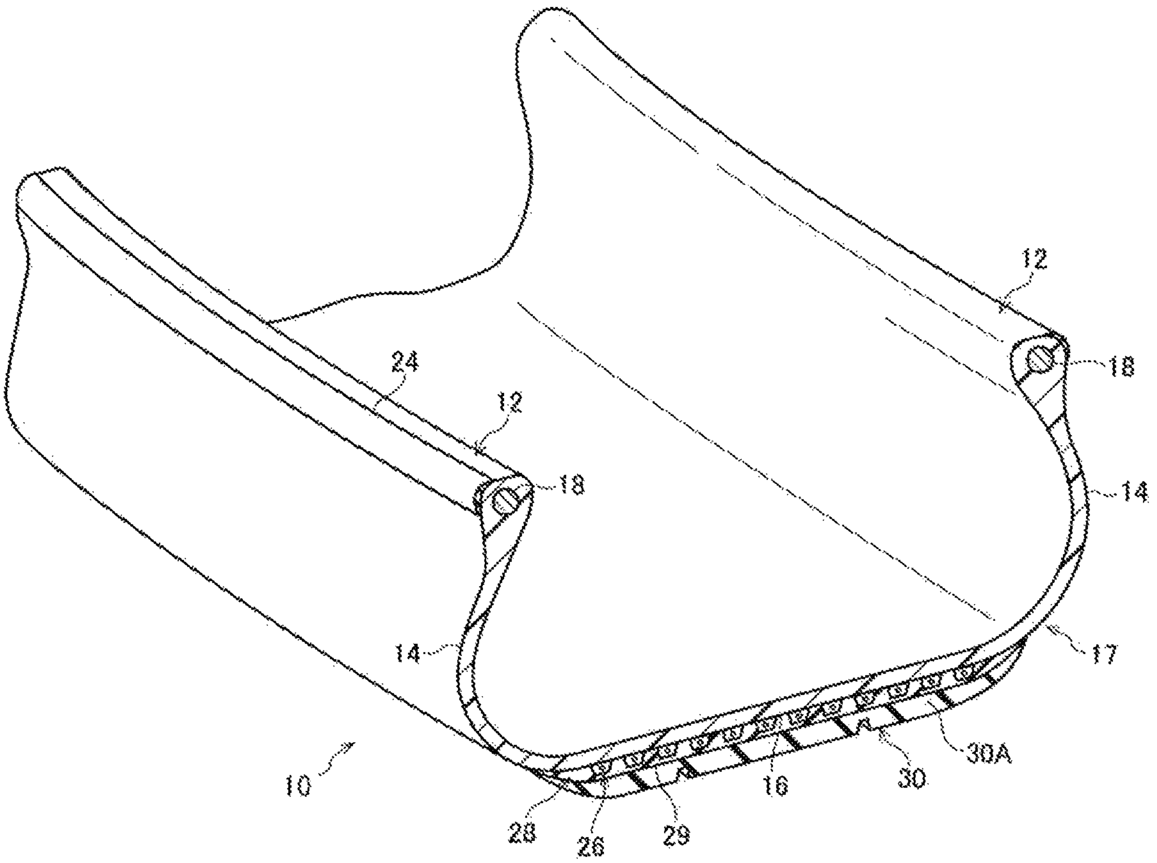
FIG. 1A is a perspective view of a section of an exemplary embodiment of the tire.

In the following, embodiments of the disclosure are explained in detail. However, the disclosure is not limited to the embodiments, and the embodiments can be implemented with appropriate modification, within a range of the disclosure.

In the specification, the "resin" refers to a concept that encompasses a thermoplastic resin (including a thermoplastic elastomer) and a thermosetting resin, but does not encompass a vulcanized rubber.

In the specification, the "thermoplastic elastomer" refers to a high-molecular compound that softens as the temperature increases and hardens as the temperature decreases, and exhibits a rubber-like elasticity, which is a copolymer of a polymer that forms a hard segment that is crystalline and has a high melting point or a high cohesion force, and a polymer that forms a soft segment that is amorphous and has a low glass-transition temperature.

In the specification, the numerical range expressed by "A to B" includes A and B as the lower and the upper values.

In the specification, the "process" refers not only an independent process but also a step that cannot be clearly distinguished from other processes.

The tire of the disclosure has a tire frame that includes a thermoplastic elastomer as a resin material, the thermoplastic elastomer having a value of orientation f, as measured by small angle X-ray scattering (SAXS), of from −0.08 to 0.08 (i.e., the absolute value of orientation f is not greater than 0.08).

The inventors have found that the tire having a tire frame as specified above exhibits a superior durability (especially cracking resistance), compared to a tire having a tire frame formed using a thermoplastic elastomer that does not satisfy the requirement as mentioned above.

In the specification, the value of orientation f of a thermoplastic elastomer indicates a degree of orientation of molecules in a crystalline section of a hard segment of the thermoplastic elastomer. The smaller the absolute value of orientation f is, the more random the orientation state of the molecules is.

In the specification, the value of orientation f is a value calculated by the following formula.

$$f = \frac{1}{2} \times (3 \times \langle \cos^2\theta \rangle - 1)$$

In the formula, θ refers to a crystalline orientation angle, and this is measured by SAXS from a sample prepared from the tire frame or a material for forming the tire frame.

Although the reason why the tire of the disclosure exhibits a superior durability is not clear, it is presumed that controlling the value of orientation f to be within a specific range enables effective dispersion of a mechanical power that is applied to the tire frame during driving, thereby improving the mechanical strength. The range of the value of orientation f is preferably from −0.08 to 0.004, more preferably from −0.02 to 0.02.

The method of controlling the value of orientation f of the thermoplastic elastomer is not specifically limited, and may be performed by changing the conditions during injection molding, such as the temperature of the thermoplastic elastomer, the temperature of the mold, or the rate of cooling. For example, the value of orientation f can be decreased by lowering the viscosity of the thermoplastic elastomer by increasing the temperature thereof during injection (i.e., increasing the temperature of the thermoplastic elastomer), and extending the time for cooling by increasing the temperature of the mold, thereby relaxing the molecular motion. Alternatively, the value of orientation f can be controlled by changing the temperature or the time of a heating process conducted after the formation of the tire frame (for example, heating for vulcanization of a tread).

The thermoplastic elastomer included in the tire frame preferably has a value of long period L, as measured by SAXS, of from 6 nm to 11 nm. When the value of long period L is 6 nm or more, friction among the molecules tends to relax. When the value of long period L is 11 nm or less, increase in elasticity due to full stretching of molecular chains tends to be suppressed. As a result, durability of the tire tends to improve.

In the specification, the value of long period L of the thermoplastic elastomer refers to a total thickness of a repeating unit formed of one crystalline portion and one amorphous portion, in a repeating structure of crystalline portions and amorphous portions in a hard segment of the thermoplastic elastomer. In the specification, the value of long period L is determined as a value of r, which corresponds to a primary peak obtained by plotting the one-dimensional autocorrelation function γ(r) with respect to r. The one-dimensional autocorrelation function γ(r) is obtained by SAXS and the following formula.

$$\gamma(r)=(\int I(q)q^2\cos(rq)dq)/(\int I(q)q^2dq)$$

The value of long period L tends to increase as the crystal growth in the thermoplastic elastomer is promoted and the thickness of the crystalline portion is increased. The greater the value of long period L is, the higher the melting point of the thermoplastic elastomer tends to be. The value of long period L is more preferably from 6 nm to 11 nm, further preferably from 5 nm to 9 nm.

The method of controlling the value of long period L of the thermoplastic elastomer is not particularly limited. For example, the value of long period L can be increased by extending the time for cooling by increasing the temperature of the mold, thereby promoting the crystal growth, while the value of long period L can be decreased by shortening the time for cooling by decreasing the temperature of the mold, thereby suppressing the crystal growth. Alternatively, the value of long period L can be controlled by changing the temperature or the time of a heating process after the formation of the tire frame (for example, heating for vulcanization of a tread).

In the tire, the thermoplastic elastomer included in the tire frame preferably has a degree of crystallinity Xc, as measured by wide angle X-ray scattering (WAXS), of from 12% to 45%. When the degree of crystallinity Xc is 12% or more, heat resistance tends to improve, and when the degree of crystallinity Xc is 45% or less, breakage occurring from crystals tends to be suppressed. The degree of crystallinity Xc is more preferably from 12% to 37%.

In the specification, the degree of crystallinity Xc of the thermoplastic elastomer indicates a ratio of a crystalline portion in the hard segment of the thermoplastic elastomer. The greater the degree of crystallinity Xc is, the greater the ratio of a crystalline portion is.

In the specification, the degree of crystallinity Xc is obtained by the following formula. The scattering intensity area of crystalline and the scattering intensity area of amorphous are obtained by WAXS.

$$Xc(\%)=(\text{scattering intensity area of crystalline})/(\text{scattering intensity area of crystalline})+(\text{scattering intensity area of amorphous})\times 100$$

The method of controlling the degree of crystallinity Xc of the thermoplastic elastomer is not particularly limited. For example, the degree of crystallinity Xc can be increased by extending the time for cooling by increasing the temperature of the mold, thereby promoting the crystal growth, while the degree of crystallinity Xc can be decreased by shortening the time for cooling by decreasing the temperature of the mold, thereby suppressing the crystal growth. Alternatively, the degree of crystallinity Xc can be controlled by changing the temperature or the time of a heating process after the formation of the tire frame (for example, heating for vulcanization of a tread).

Most preferably, the thermoplastic elastomer included in the tire frame has a value of orientation f as measured by SAXS of from −0.08 to 0.08, a value of long period L as measured by SAXS of from 6 nm to 11 nm, and a degree of crystallinity Xc as measured by WAXD of from 12% to 45%.

By using a tire frame satisfying the above conditions, a tire that exhibits a superior resistance to an external damage such as cracking, while maintaining a favorable fuel efficiency, can be provided.

The type of the thermoplastic elastomer used for forming the tire frame is not particularly limited, and examples thereof include polyamide thermoplastic elastomer (TPA), polystyrene thermoplastic elastomer (TPS), polyurethane thermoplastic elastomer (TPU), olefinic thermoplastic elastomer (TPO), polyester thermoplastic elastomer (TPEE), thermoplastic rubber vulcanizate (TPV), and other thermoplastic elastomers (TPZ). The definition and the classification of the thermoplastic elastomer may rely on JIS K 6418:2007.

From the viewpoint of mechanical durability, the thermoplastic elastomer is preferably a polyamide thermoplastic elastomer. From the viewpoint of heat resistance and moist heat resistance, the thermoplastic elastomer is preferably a polyamide thermoplastic elastomer in which a polymer that forms a hard segment is polyamide (such as polyamide 12) and a polymer that forms a soft segment is polyether; more preferably a polyamide thermoplastic elastomer in which a polymer that forms a hard segment is polyamide 12 and a polymer that forms a soft segment is polyether, and the hard segment and the soft segment are linked by an amide bond, and an ester bond is not included.

Polyamide Thermoplastic Elastomer

The polyamide thermoplastic elastomer refers to a thermoplastic resin material that is a copolymer formed of a polymer that forms a hard segment that is crystalline and has a high melting point and a polymer that forms a soft segment that is amorphous and has a low glass transition temperature, wherein the polymer that forms a hard segment includes an amide bond (—CONH—) in its main chain.

Examples of the polyamide thermoplastic elastomer include a material in which at least a polyamide forms a hard segment that is crystalline and has a high melting point, and a polymer other than the polyamide (such as polyester or polyether) forms a soft segment that is amorphous and has a low glass transition temperature.

The polyamide thermoplastic elastomer may be formed by using a chain elongating agent (such as a dicarboxylic acid) in addition to the hard segment and the soft segment.

Specific examples of the polyamide thermoplastic elastomer include the polyamide thermoplastic elastomer (TPA)

as defined in JIS K6418:2007 and the polyamide elastomer described in JP-A No. 2004-346273.

In the polyamide thermoplastic elastomer, examples of the polyamide that forms a hard segment include a polyamide formed from a monomer represented by the following Formula (1) or Formula (2).

$$H_2N—R^1—COOH \quad (1)$$

In Formula (1), $R^1$ represents a hydrocarbon molecular chain having 2 to 20 carbon atoms (for example, an alkylene group having 2 to 20 carbon atoms).

(2)

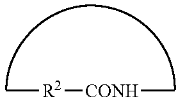

In Formula (2), $R^2$ represents a hydrocarbon molecular chain having 3 to 20 carbon atoms (for example, an alkylene group having 3 to 20 carbon atoms).

In Formula (1), $R^1$ is preferably a hydrocarbon molecular chain having 3 to 18 carbon atoms (for example, an alkylene group having 3 to 18 carbon atoms), more preferably a hydrocarbon molecular chain having 4 to 15 carbon atoms (for example, an alkylene group having 4 to 15 carbon atoms), further preferably a hydrocarbon molecular chain having 10 to 15 carbon atoms (for example, an alkylene group having 10 to 15 carbon atoms).

In Formula (2), $R^2$ is preferably a hydrocarbon molecular chain having 3 to 18 carbon atoms (for example, an alkylene group having 3 to 18 carbon atoms), more preferably a hydrocarbon molecular chain having 4 to 15 carbon atoms (for example, an alkylene group having 4 to 15 carbon atoms), further preferably a hydrocarbon molecular chain having 10 to 15 carbon atoms (for example, an alkylene group having 10 to 15 carbon atoms).

Examples of the monomer represented by Formula (1) or Formula (2) include a ω-aminocarboxylic acid and a lactam. Examples of the polyamide that forms a hard segment include a polycondensate of a ω-aminocarboxylic acid or a lactam, and a polycondensate of a diamine and a dicarboxylic acid.

Examples of the ω-aminocarboxylic acid include aliphatic ω-aminocarboxylic acids having 5 to 20 carbon atoms, such as 6-aminocaproic acid, 7-aminoheptanoic acid, 8-aminooctanoic acid, 10-aminocapric acid, 11-aminoundecanoic acid and 12-aminododecanoic acid.

Examples of the lactam include aliphatic lactams having 5 to 20 carbon atoms, such as lauryllactam, ε-caprolactam, undecalactam, ω-enantholactam and 2-pyrrolidone.

Examples of the diamine include aliphatic diamines having 2 to 20 carbon atoms, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-triemthylhexamethylenediamine, 2,4,4-trimethylhexamethylenediamine, 3-methylpentamethylenediamine and m-xylylenediamine.

The dicarboxylic acid may have a structure represented by $HOOC—(R^3)_m—COOH$ ($R^3$ is a hydrocarbon molecular chain having 3 to 20 carbon atoms, and m is 0 or 1), and examples thereof include aliphatic dicarboxylic acids having 2 to 20 carbon atoms, such as oxalic acid, succinic acid, glutaric acid, adipic acid, pimelic acid, subric acid, azelaic acid, sebacic acid and dodecanedioic acid.

As the polyamide that forms a hard segment, a polyamide obtained by ring-opening polycondensation of laurylIacram, ε-caprolactam or udecanelactam is preferred.

Examples of the polymer that forms a soft segment include polyester and polyether, and specific examples thereof include polyethyelne glycol, polypropylene glycol, polytetramethylene ether glycol, and ABA-type triblock polyether. These polymers may be used alone or in combination of two or more kinds. It is also possible to use a polyether diamine or the like, which is obtained by allowing ammonia or the like to react with a terminal end of a polyether.

The ABA-type triblock polyether refers to a polyether having a structure represented by the following Formula (3).

(3)

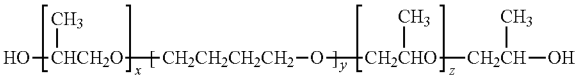

In Formula (3), each of x and z independently represents an integer of from 1 to 20, and y represents an integer of from 4 to 50.

In Formula (3), each of x and z is preferably independently an integer of from 1 to 18, more preferably an integer of from 1 to 16, further preferably an integer of from 1 to 14, yet further preferably an integer of from 1 to 12. In Formula (3), y is preferably an integer of from 5 to 45, more preferably an integer of from 6 to 40, further preferably an integer of from 7 to 35, yet further preferably an integer of from 8 to 30.

Examples of the combination of a hard segment and a soft segment include combinations of these selected from the hard segments and the soft segments as described above. Among the combinations, a combination of a ring-opening polycondensate of lauryl lactam and polyethylene glycol, a combination of a ring-opening polycondensate of lauryl lactam and polypropylene glycol, a combination of a ring-opening polycondensate of lauryl lactam and polytetramethylene ether glycol, and a combination of a ring-opening polycondensate of lauryl lactam and ABA-type triblock polyether are preferred. Among these combinations, a combination of a ring-opening polycondensate of lauryl lactam and ABA-type triblock polyether is more preferred.

The number average molecular weight of the polymer that forms a hard segment (polyamide) is preferably from 300 to 15000, from the viewpoint of melt moldability. The number average molecular weight of the polymer that forms a soft segment is preferably from 200 to 6000 from the viewpoint of toughness and low-temperature flexibility. The mass ratio (x:y) of the hard segment (x) and the soft segment (y) is preferably from 50:50 to 90:10, more preferably from 50:50 to 80:20, from the viewpoint of moldability.

The polyamide thermoplastic elastomer can be synthesized by a known process of copolymerizing a polymer that forms a hard segment and a polymer that forms a soft segment.

Examples of the commercially available products of the polyamide thermoplastic elastomer include the UBESTA XPA series of Ube Industries, Ltd. (for example, XPA9063X1, XPA9055X1, XPA9048X2, XPA9048X1, XPA9040X1, XPA9040X2 and XPA9044) and the VESTA- MID series of Daicel-Evonik Ltd. (for example, E40-S3, E47-S1, E47-S3, E55-S1, E55-S3, EX9200 and E50-R2).

Polystylene Thermoplastic Elastomer

Examples of the polystylene thermoplastic elastomer include a material in which at least polystyrene forms a hard segment, and a polymer other than the polystyrene (such as polybutadiene, polyisoprene, polyethylene, hydrogenated polybutadiene or hydrogenated polyisoprene) forms a soft segment that is amorphous and has a low glass transition temperature.

Examples of the polystyrene that forms a hard segment include a polystyrene obtained by a known process such as radical polymerization or ionic polymerization, and specific examples thereof include a polystyrene obtained by anionic living polymerization.

Examples of the polystyrene that forms a soft segment include polybutadiene, polyisoprene and poly(2,3-dimethyl-butadiene).

Examples of the combination of a hard segment and a soft segment include combinations of these selected from the hard segments and the soft segments as described above. Among the combinations, a combination of polystyrene and polybutadiene and a combination of polystyrene and poly-isoprene are preferred. In order to suppress unintentional crosslinking reaction of the thermoplastic elastomer, the soft segment is preferably hydrogenated.

The number average molecular weight of the polymer that forms a hard segment (polystyrene) is preferably from 5000 to 500000, more preferably from 10000 to 200000.

The number average molecular weight of the polymer that forms a soft segment is preferably from 5000 to 1000000, more preferably from 10000 to 800000, further preferably from 30000 to 500000. The mass ratio (x:y) of the hard segment (x) and the soft segment (y) is preferably from 5:95 to 80:20, more preferably from 10:90 to 70:30, from the viewpoint of moldability.

The polystyrene thermoplastic elastomer can be synthesized by a known process of copolymerizing a polymer that forms a hard segment and a polymer that forms a soft segment.

Examples of the polystyrene thermoplastic elastomer include styrene-butadiene copolymer such as SBS (polystyrene-poly(butylene)block-polystyrene) and SEBS (polystyrene-poly(ethylene/butylene)block-polystyrene); styrene-isoprene copolymer (polystyrene-polyisoprene block-polystyrene); and styrene-propylene copolymer such as SEP (polystyrene-(ethylene/propylene)block), SEPS (polystyrene-poly(ethylene/propylene)block-polystyrene), SEEPS (polystyrene-poly(ethylene-ethylene/propylene)block-polystyrene)block-polystyrene) and SEB (polystyrene(ethylene/butylene)block).

Examples of the commercially available products of the polystyrene thermoplastic elastomer include the TUFTEC series of Asahi Kasei Corporation (for example, H1031, H1041, H1043, H1051, H1052, H1053, H1062, H1082, H1141, H1221 and H1272), and the SEBS series of Kuraray Co., Ltd (for example, 8007 and 8076) and the SEPS series of Kuraray Co., Ltd (for example, 2002 and 2063).

Polyurethane Thermoplastic Elastomer

Examples of the polyurethane thermoplastic elastomer include a material in which at least polyurethane forms a hard segment that forms a pseudo-crosslinking structure by physical aggregation, and a polymer other than the polyurethane that forms a soft segment that is amorphous and has a low glass transition temperature.

Specific examples of the polyurethane thermoplastic elastomer include the polyurethane thermoplastic elastomer (TPU) as specified by JIS K6418:2007. The polyurethane thermoplastic elastomer may be a copolymer of a soft segment including a structural unit represented by the following Formula A and a hard segment including a structural unit represented by the following Formula B.

Formula A

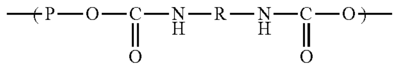

Formula B

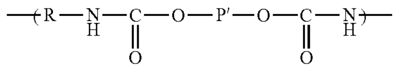

In the Formulae, P represents a long-chain aliphatic polyether or a long-chain aliphatic polyester. R represents an aliphatic hydrocarbon, an alicyclic hydrocarbon or an aromatic hydrocarbon. P' represents a short-chain aliphatic hydrocarbon, an alicyclic hydrocarbon or an aromatic hydrocarbon.

In Formula A, the long-chain aliphatic polyether or the long-chain aliphatic polyester represented by P may be a polyester having a molecular weight of from 500 to 5000 The long-chain aliphatic polyether or the long-chain aliphatic polyester represented by P derives from a diol compound including the long-chain aliphatic polyether or the long-chain aliphatic polyester. Examples of the diol compound include polyethylene glycol, polypropylene glycol, polytetramethylene ether glycol, poly(butyleneadipate)diol, poly-ε-caprolactone diol, poly(hexanethylenecarbonate)diol and ABA-type triblock polyether compounds, having a molecular weight of the aforementioned range. These compounds may be used alone or in combination of two or more kinds.

In Formula A and Formula B, R derives from a diisocyanate compound including an aliphatic hydrocarbon, an alicyclic hydrocarbon or an aromatic hydrocarbon that is represented by R.

Examples of the diisocyanate compound including an aliphatic hydrocarbon represented by R include 1,2-ethylene diisocyanate, 1,3-propylene diisocyanate, 1,4-butane diisocyanate and 1,6-hexamethylene diisocyanate.

Examples of the diisocyanate compound including an alicyclic hydrocarbon represented by R include 1,4-cyclohexane diisocyanate and 4,4-cyclohexane diisocyanate.

Examples of the diisocyanate compound including an aromatic hydrocarbon represented by R include 4,4'-diphenylmethane diisocyanate and tolylene diisocyanate.

These compounds may be used alone or in combination of two or more kinds.

In Formula B, examples of the short-chain aliphatic hydrocarbon, the alicyclic hydrocarbon or the aromatic hydrocarbon represented by P' include those having a molecular weight of less than 500. P' derives from a diol compound including the short-chain aliphatic hydrocarbon, the alicyclic hydrocarbon or the aromatic hydrocarbon represented by P'.

Examples of the diol compound including a short-chain aliphatic hydrocarbon represented by P' include glycol and polyalkylene glycol, such as ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol, and 1,10-decanediol.

Examples of the diol compound including an alicyclic hydrocarbon represented by P' include cyclopentane-1,2- diol, cyclohexane-1,2-diol, cyclohexane-1,3-diol, cyclohexane-1,4-diol and cyclohexane-1,4-dimethanol.

Examples of the diol compound including an aromatic hydrocarbon represented by P' include hydroquinone, resorcin, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenyl sulfide, 4,4'-dihydroxydiphenylsulfone, 4,4'-dihydroxybenzophenone, 4,4'-dihydroxydiphenylmethane, bisphenol A, 1,1-di(4-hydroxyphenyl)cyclohexane, 1,2-bis(4-hydroxyphenoxy)ethane, 1,4-dihydroxynaphthalene and 2,6-dihydroxynaphthalene.

These compounds may be used alone or in combination of two or more kinds.

The number average molecular weight of the polymer that forms a hard segment (polyurethane) is preferably from 300 to 1500, from the viewpoint of melt moldability. The number average molecular weight of the polymer that forms a soft segment is preferably from 500 to 20000, more preferably from 500 to 5000, further preferably from 500 to 3000, from the viewpoint of flexibility and thermal stability of the polyurethane thermoplastic elastomer. The mass ratio (x:y) of the hard segment (x) and the soft segment (y) is preferably from 15:85 to 90:10, more preferably from 30:70 to 90:10, from the viewpoint of moldability.

The polyurethane thermoplastic elastomer may be synthesized by a known process of copolymerizing a polymer that forms a hard segment and a polymer that forms a soft segment. Examples of the polyurethane thermoplastic elastomer include the thermoplastic polyurethane described in JP-A No. 5-331256.

Specific examples of the polyurethane thermoplastic elastomer include a combination of a hard segment formed from an aromatic diol and an aromatic diisocyanate, and a soft segment formed from polycarbonate ester, preferably at least one selected from the group consisting of a copolymer of trilenediisocyanate (TDI)/polyester-based polyol, a copolymer of TDI/polyether-based polyol, a copolymer of TDI/caprolactone-based polyol, a copolymer of TDI/polycarbonate-based polyol, a copolymer of 4,4'-diphenylmethane diisocyanate (MDI)/polyester-based polyol, a copolymer of MDI/polyether-based polyol, a copolymer of MDI/caprolactone-based polyol, a copolymer of MDI/polycarbonate-based polyol, and a copolymer of MDI+hydroquinone/polyhexamethylene carbonate; more preferably at least one selected from the group consisting of a copolymer of TDI/polyester-based polyol, a copolymer of TDI/polyether-based polyol, a copolymer of MDI/polyester-based polyol, a copolymer of MDI/polyether-based polyol, and a copolymer of MDI+hydroquinone/polyhexamethylene carbonate.

Examples of the commercially available products of the polyurethane thermoplastic elastomer include the ELASTOLLAN series of BASF Japan Ltd. (for example, ET680, ET690 and ET890), the KURAMIRON U series of Kuraray Co., Ltd. (for example, No. 2000 series, No. 3000 series, No. 8000 series and No. 9000 series), and the MIRACTRAN series of Nippon Miractran Co., Ltd. (for example, XN-2001, XN-2004, P390RSUP, P480RSUI, P26MRNAT, E490, E590 and P890).

Olefinic Thermoplastic Elastomer

Examples of the olefinic thermoplastic elastomer include materials in which at least polyolefin forms a hard segment that is crystal and has a high melting point and a polymer other than the polyolefin that forms a soft segment (for example, polyolefin, the other polyolefin and a polyvinyl compound) forms a soft segment that is amorphous and has a low glass transition temperature. Examples of the polyolefin that forms a hard segment include polyethylene, polypropylene, isotactic polypropylene and polybutene.

Examples of the olefinic thermoplastic elastomer include an olefin-α-olefin random copolymer and an olefin block copolymer.

Specific examples of the olefinic thermoplastic elastomer include propylene block copolymer, ethylene-propylene copolymer, propylene-1-hexene copolymer, propylene-4-methyl-1-pentene copolymer, propylene-1-butene copolymer, ethylene-1-hexene copolymer, ethyl ene-4-methyl-pentene copolymer, ethylene-1-butene copolymer, 1-butene-1-hexene copolymer, 1-butene-4-methyl-pentene copolymer, ethyl ene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer and propylene-vinyl acetate copolymer.

Among these copolymers, the olefinic thermoplastic elastomer is preferably at least one selected from the group consisting of propylene block copolymer, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer and propylene-vinyl acetate copolymer; more preferably at least one selected from the group consisting of ethylene-propylene copolymer, propylene-1-butene copolymer, ethylene-1-butene copolymer, ethylene-methyl methacrylate copolymer, ethylene-methyl acrylate copolymer, ethylene-ethyl acrylate copolymer and ethylene-butyl acrylate copolymer.

It is possible to combine two or more kinds of olefinic resins, such as ethylene and propylene. The content of the olefinic resin in the olefinic thermoplastic elastomer is preferably from 50% by mass to 100% by mass.

The number average molecular weight of the olefinic thermoplastic elastomer is preferably from 5000 to 10000000. When the number average molecular weight of the olefinic thermoplastic elastomer is from 5000 to 10000000, a resin material having sufficient mechanical properties and excellent processability can be obtained. From the same viewpoint, the number average molecular weight of the olefinic thermoplastic elastomer is more preferably from 7000 to 1000000, further preferably from 10000 to 1000000. When the number average molecular weight is within this rage, mechanical properties and processability of the resin material can be further improved.

The number average molecular weight of the polymer that forms a soft segment is preferably from 200 to 6000, from the viewpoint of toughness and flexibility at low temperature. The mass ratio (x:y) of the hard segment (x) and the soft segment (y) is preferably from 50:50 to 95:5, more preferably from 50:50 to 90:10, from the viewpoint of moldability.

The olefinic thermoplastic elastomer can be synthesized by a known process for copolymerization.

It is possible to use an acid-modified olefinic thermoplastic elastomer as the olefinic thermoplastic elastomer.

The acid-modified olefinic thermoplastic elastomer refers to an olefinic thermoplastic elastomer that is bonded with an unsaturated compound having an acidic group such as a carboxyl group, a sulfuric acid group or a phosphoric acid group.

Examples of the method of allowing an unsaturated compound having an acidic group to bond with an olefinic thermoplastic elastomer include a method of allowing an unsaturated bonding site of an unsaturated carboxylic acid (generally maleic acid anhydride) to bond with an olefinic thermoplastic elastomer (for example, by graft polymerization).

The unsaturated compound having an acidic group is preferably an unsaturated compound having a carboxyl group that is relatively weak in acidity, from the viewpoint of suppressing degradation of the olefinic thermoplastic elastomer, and examples of the unsaturated compound having a carboxyl group include acrylic acid, methacrylic acid, itaconic acid, crotonic acid, isocrotonic acid and maleic acid.

Examples of the commercially available products of the olefinic thermoplastic elastomer include the TAFMER series of Mitsui Chemicals, Inc. (for example, A0550S, A1050S, A4050S, A1070S, A4070S, A35070S, A1085S, A4085S, A7090, A70090, MH7007, MH17010, XM-7070, XM-7080, BL4000, BL2481, BL3110, BL3450, P-0275, P-0375, P-0775, P-0180, P-0280, P-0480 and P-0680), the NUCREL series of Du Pont-Mitsui Polychemicals Co., Ltd. (for example, AN4214C, AN4225C, AN42115C, N0903HC, N0908C, AN42012C, N410, N1050H, N1108C, N1110H, N1207C, N1214, AN4221C, N1525, N1560, N0200H, AN4228C, AN4213C and N035C), the ELVALOY AC series (for example, 1125AC, 1209AC, 1218AC, 1609AC, 1820AC, 1913AC, 2112AC, 2116AC, 2615AC, 2715AC, 3117AC, 3427AC and 3717AC), the ACRYFT series of Sumitomo Chemical Co., Ltd., the EVATATE series of Sumitomo Chemical Co., Ltd., the ULTRACENE series of Tosoh Corporation, the PRIME TPO series (for example, E-2900H, F-3900H, E-2900, F-3900, J-5900, E-2910, F-3910, J-5910, E-2710, F-3710, J-5910, E-2740, F-3740, R110MP, R110E, T310E and M142E).

Polyester Thermoplastic Elastomer

Examples of the polyester thermoplastic elastomer include a material in which at least polyester forms a hard segment that is crystal and has a high melting point, and a polymer (for example, polyester or polyether) forms a soft segment that is amorphous and has a low glass transition temperature.

The polyester that forms a hard segment may be an aromatic polyester.

The aromatic polyester can be formed from, for example, an aromatic dicarboxylic acid or an ester-forming derivative thereof and an aliphatic diol. A preferred example of the aromatic polyester is a polybutylene terephthalate derived from terephthalic acid and/or dimethyl terephthalate and 1,4-butanediol. Other examples of the aromatic polyester include a polyester derived from a dicarboxylic acid (for example, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid and an ester-forming derivative thereof) and a diol compound having a molecular weight of 300 or less (for example, an aliphatic diol such as ethylene glycol, trimethylene glycol, pentamethylene glycol, hexamethylene glycol, neopentyl glycol and decamethyelene glycol, an alicyclic diol such as 1,4-cyclohexane dimethanol and tricyclodecane dimethylol, and an aromatic diol such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl and 4,4'-dihydroxy-p-quaterphenyl).

The polyester may be a copolymerized polyester in which two or more dicarboxylic acid components and two or more diol components are combined.

It is also possible to copolymerize a polyfunctional (at least trifunctional) carboxylic component such as a polyfunctional hydroxy acid component in an amount of within 5 mol %.

Preferred examples of the polyester that forms a hard segment include polyethylene terephthalate, polybutylene terephthalate, polymethylene terephthalate and polyethylene naphthalate, polybuthylene naphthalate, wherein polybutylene terephthalate is more preferred.

Examples of the polymer that forms a soft segment include an aliphatic polyester and an aliphatic polyether.

Examples of the aliphatic polyether include poly(ethylene oxide)glycol, poly(propylene oxide)glycol, poly(tetramethylene oxide) glycol, poly(hexamethylene oxide)glycol, a copolymer of ethylene oxide and propylene oxide, an ethylene oxide-adduct of poly(propylene oxide)glycol, and a copolymer of ethylene oxide and tetrahydrofuran.

Examples of the aliphatic polyester include poly(ε-caprolactone), polyenantholactone, polycaprylolactone, polybutylene adipate, and polyethylene adipate.

Among these aliphatic polyethers and aliphatic polyesters, from the viewpoint of elasticity of a polyester block copolymer, the polymer that forms a soft segment is preferably poly(tetramethylene oxide)glycol, an ethylene oxide-adduct of poly(propylene oxide)glycol, poly(ε-caprolactone), polybutylene adipate and polyethylene adipate are preferred.

The number average molecular weight of the polymer that forms a soft segment is preferably from 300 to 6000, from the viewpoint of toughness and low-temperature flexibility. The mass ratio (x:y) of the hard segment (x) and the soft segment (y) is preferably from 99:1 to 20:80, more preferably from 98:2 to 30:70, from the viewpoint of moldability.

Examples of the combination of a hard segment and a soft segment include each of the combination of a hard segment and a soft segment as mentioned above.

Among these, the combination of a hard segment and a soft segment is preferably a combination in which a hard segment is polybutylene terephthalate and a soft segment is an aliphatic polyether, more preferably a combination in which a hard segment is polybutylene terephthalate and a soft segment is poly(ethylene oxide)glycol.

Examples of the commercially available products of the polyester thermoplastic elastomer include the HYTREL series of Du Pont-Toray Co., Ltd. (for example, 3046, 5557, 6347, 4047 and 4767) and the PELPRENE series of Toyobo Co., Ltd. (for example, P30B, P40B, P40H, P55B, P70B, P150B, P280B, P450B, P150M, S1001, S2001, S5001, S6001 and S9001).

The polyester thermoplastic elastomer can be synthesized by copolymerizing a polymer that forms a hard segment and a polymer that forms a soft segment by a known process.

The melting point of the resin material is generally approximately from 100° C. to 350° C. From the viewpoint of durability and productivity of the tire, the melting point of the resin material is preferably from 100° C. to 250° C., more preferably from 120° C. to 250° C.

The resin material may include a component other than the thermoplastic elastomer, as necessary. Examples of the component include a rubber, a thermoplastic resin, filler (such as silica, calcium carbonate and clay), an anti-aging agent, an oil, a plasticizer, a color former and a weatherproof agent.

It is known that the rolling properties of the tire and the injection moldability of the resin material are improved by adding a plasticizer to the resin material. On the other hand, the addition of plasticizer may affect the adhesion of the resin material with respect to the other materials by causing blooming and bleeding, when the amount thereof is too much. It is considered that occurrence of blooming and bleeding can be avoided by using a plasticizer that is highly compatible with the thermoplastic elastomer, while improving the rolling properties of the tire and maintaining moldability and safety.

When a polyamide thermoplastic elastomer is used as the thermoplastic elastomer, it is preferred to use a benzoic acid ester having a SP value that is close to that of the polyamide used as the main component of the polyamide thermoplastic elastomer. In order to improve the anti-volatile properties, the plasticizer preferably has a greater molecular weight. Examples of the benzoic acid ester that satisfies these requirements include a benzoic acid ester having a hydroxy group at a para position of the aromatic ring and an alkyl chain of 5 of 8 carbon atoms at the ester portion, such as heptyl p-hydroxybenzoate and 2-ethylhexyl p-hydroxybenzoate.

When a benzoic acid ester is used as a plasticizer, the thermoplastic elastomer is preferably a polyamide thermoplastic elastomer, more preferably an aliphatic polyamide thermoplastic elastomer, further preferably an aliphatic polyamide thermoplastic elastomer having an aliphatic hydrocarbon chain of 6 to 12 carbon atoms, yet further preferably an aliphatic polyamide thermoplastic elastomer having an aliphatic hydrocarbon chain of 12 carbon atoms.

The amount of the benzoic acid ester is preferably 30 parts by mass or less, more preferably from 5 parts by mass to 30 parts by mass, with respect to 100 parts by mass of the thermoplastic elastomer.

When the thermoplastic elastomer is a thermoplastic elastomer including an aliphatic polyamide component synthesized by ring-opening polymerization, the amount thereof is preferably from 5 parts by mass to 30 parts by mass with respect to 100 parts by mass of the thermoplastic elastomer.

When the thermoplastic elastomer is a thermoplastic elastomer including an aliphatic polyamide component synthesized by copolymerization of a diamine and a dicarboxylic acid compound, the amount thereof is preferably from 20 parts by mass to 30 parts by mass with respect to 100 parts by mass of the thermoplastic elastomer.

From the viewpoint of sufficiently achieving the effect of the tire of the disclosure, the content of the resin material in the tire frame is preferably 50 parts by mass or more, more preferably 80 parts by mass or more, further preferably 90 parts by mass or more.

When the resin material includes a component other than the thermoplastic elastomer, from the viewpoint of sufficiently achieving the effect of the tire of the disclosure, the content of the thermoplastic elastomer in the resin material is preferably 50 parts by mass or more, more preferably 80 parts by mass or more, further preferably 90 parts by mass or more.

The tensile elastic modulus of the resin material (tire frame) as defined by JIS K7113:1995 is preferably from 50 MPa to 1000 MPa, more preferably from 50 MPa to 800 MPa, further preferably from 50 MPa to 700 MPa. When the tensile elastic modulus of the resin material is from 50 MPa to 1000 MPa, attachment of the tire to a rim can be efficiently performed while maintaining the shape of the tire frame.

The tensile strength of the resin material (tire frame) as defined by JIS K7113:1995 is generally approximately from 15 MPa to 70 MPa, preferably from 17 MPa to 60 MPa, more preferably from 20 MPa to 55 MPa.

The tensile yield strength of the resin material (tire frame) as defined by JIS K7113:1995 is preferably 5 MPa to more, more preferably from 5 MPa to 20 MPa, further preferably from 5 MPa to 17 MPa. When the tensile yield strength of the resin material is 5 MPa or more, endurance of the tire against deformation caused by a load applied to the tire during running can be improved.

The tensile yield elongation of the resin material (tire frame) as defined by JIS K7113:1995 is preferably 10% or more, more preferably from 10% to 70%, further preferably from 15% to 60%. When the tensile yield elongation of the resin material is 10% or more, the elastic region is large and attachment to a rim can be favorably performed.

The tensile elongation at break of the resin material (tire frame) as defined by JIS K7113:1995 is preferably 50% or more, more preferably 100% or more, further preferably 150% or more, yet further preferably 200% or more. When the tensile elongation at break of the resin material is 50% or more, attachment to a rim can be favorably performed and breakage caused by impact can be suppressed.

The deflection temperature under load (0.45 MPa) of the resin material (tire frame) as defined by ISO 75-2 or ASTM D648 is preferably 50° C. or more, more preferably from 50° C. to 150° C., further preferably from 50° C. to 130° C. When the deflection temperature under load is 50° C. or more, deformation of the tire frame can be suppressed even in a case of performing vulcanization in the production of the tire.

The tire may include other members than the tire frame. For example, the tire may include a reinforcing member that is disposed at the outer periphery of the tire frame or the like, for the purpose of reinforcing the same. The reinforcing member may be, for example, a metal member such as a steel cord that is coated with a resin material. The resin material is not particularly limited, but is preferably a thermoplastic elastomer from the viewpoint of elasticity that is required during running, and moldability during production. In a case in which a resin coating is bonded to the tire frame by melting by heat, the resin material is preferably a polyamide thermoplastic elastomer.

In an embodiment, a reinforcing member, having a structure in which a metal member is covered with a resin layer via an adhesive (adhesive layer), may be disposed on the tire frame.

In that case, the Martens hardness of the tire frame (d1), the Martens hardness of the resin layer (d2) and the Martens hardness of the adhesive layer (d3) preferably satisfy a relationship of $d1 \leq d2 < d3$. When the resin layer has a Martens hardness that is smaller than that of the adhesive layer but is greater than or equal to that of the tire frame, difference in stiffness between the resin material that forms the tire frame and the metal member can be relaxed effectively. As a result, durability of the tire can be further improved.

In the following, embodiments of the tire of the disclosure are explained by referring to the drawings.

Figure 1B:
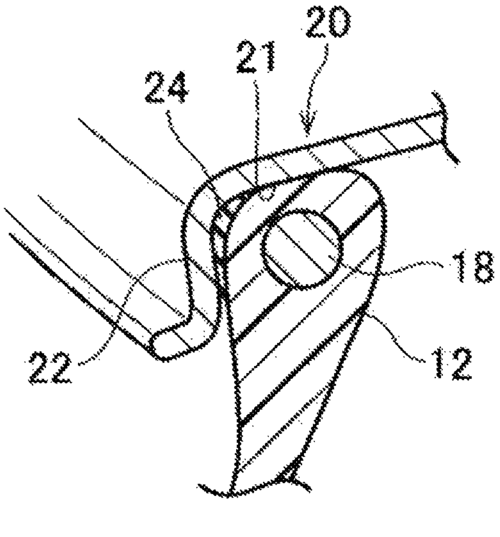
FIG. 1B is a sectional view of the bead portion of the tire attached to a rim.

FIG. 1A is a schematic view of a section of a portion of tire 10. FIG. 1B is a sectional view of a bead portion of tire 10 when it is attached to a rim. As shown in FIG. 1A, tire 10 has a sectional shape similar to that of a conventional rubber tire. As shown in FIG. 1A, tire 10 has tire frame 17 that includes a pair of bead portions 12 that are in contact with bead sheet 21 and rim flange 22 of rim 20 shown in FIG. 1B; side portions 14 that extend from bead portions 12 along the tire diameter direction; and crown portion 16 (outer periphery portion) that connects the outer edge in the tire diameter direction of one side portion 14 and the outer edge in the tire diameter direction of the other one of side portion 14.

Tire frame 17 corresponds to the tire frame, and is formed from the resin material as described above.

Although the tire frame of this embodiment is totally formed from the resin material, the tire of the disclosure is not limited thereto and different resin materials may be used for respective portions (such as side portions 14, crown portion 16 and bead portions 12), like a conventional pneumatic tire. Further, a reinforcing material (such as a fiber, a cord, a nonwoven fabric, a cloth made of polymer material or metal) may be embedded in the tire frame.

Tire body 17 of this embodiment is formed by bonding an equatorial plane of a tire frame half with an equatorial plane of another tire frame half, each having a shape of tire frame 17 obtained by cutting the same along the circumferential direction. It is also possible to form tire frame 17 from three or more members.

The tire frame halves may be prepared by a method such as vacuum molding, pressure molding, injection molding or melt casting. Therefore, it is not necessary to perform vulcanization and a manufacturing process can be simplified and the time for the production can be shortened, as compared to a conventional rubber tire.

In this embodiment, bead core 18 having a ring shape is embedded in bead portion 12 shown in FIG. 1B, like a conventional rubber tire. Although a steel cord is used as bead core 18 in this embodiment, it is possible to use an organic fiber cord, a resin-coated organic fiber cord, a hard resin cord or the like. It is possible to omit bead core 18 as long as stiffness of bead portion 12 is secured and attachment to rim 20 is favorably performed.

In this embodiment, seal layer 24 having a ring shape is formed at a portion at which bead 12 contacts rim 20 or at least rim flange 22. Seal layer 24 is formed from a material having a better sealing property than that of the resin material for tire frame 17. Seal layer 24 may be formed also at a portion at which tire frame 17 (bead portion 12) contacts bead sheet 21.

Seal layer 24 can be omitted if the resin material for tire frame 17 has a sufficient sealing property with respect to rim 20. Examples of the material that has a better sealing property than that of the resin material for tire frame 17 include rubber, a thermoplastic resin that is softer than the resin material, and a thermoplastic elastomer that is softer than the resin material.

As shown in FIG. 1A, reinforcing cord 26 is wound around crown portion 16 in a circumferential direction of tire frame 17. Reinforcing cord 26 is formed from a resin material having a higher degree of stiffness than the resin material for tire frame 17. Reinforcing material 26 is wound around tire frame 17 in a spiral manner, and at least partially embedded in crown portion 16 as seen in a sectional view along an axial direction of tire frame 17.

At the outer side in a tire diameter direction of reinforcing cord 28, tread 30 is disposed. Tread 30 is formed from a material having a better anti-friction property than the resin material for tire frame 17, such as rubber.

Figure 2:
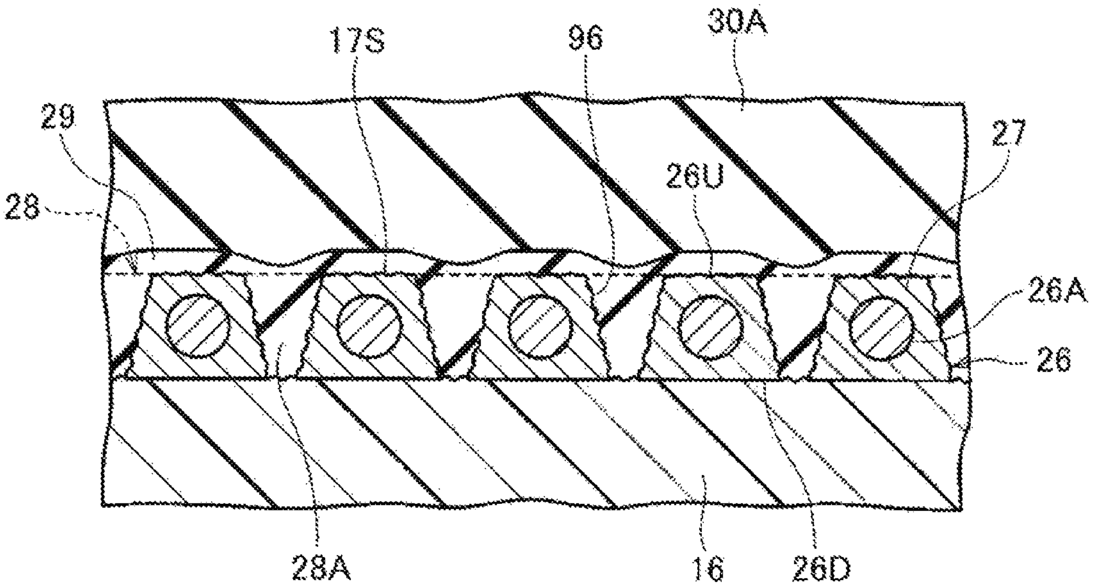
FIG. 2 is a sectional view cut along the rotation axis of the tire showing a state with a reinforcing cord embedded in the crown portion.

In this embodiment, as shown in FIG. 2, reinforcing cord 26 is in a state in which metal member 26A such as a steel cord is covered with coating resin material 27 (coated cord member). Although the same material with the resin material for tire frame 17 is used as coating resin material 27 in this embodiment, other kinds of thermoplastic resin or thermoplastic elastomer may be used. Reinforcing cord 26 is bonded to crown portion 16 by a method such as welding or with an adhesion. Reinforcing cord 26 may be a steel cord or the like that is not covered with coating resin material 27.

The elastic modulus of coating resin material 27 is preferably within 0.1 to 10 times the elastic modulus of the resin material for tire frame 17. When the elastic modulus of coating resin material 27 is not greater than 10 times the elastic modulus of the resin material for tire frame 17, the crown portion is not too hard and attachment to a rim can be easily performed. When the elastic modulus of coating resin material 27 is not less than 0.1 times the elastic modulus of the resin material for tire frame 17, the resin that forms reinforcing cord layer 28 is not too soft, and a shear stiffness within a belt plane is excellent and a cornering force is improved.

In this embodiment, as shown in FIG. 2, reinforcing cord 26 has a sectional shape that is approximately trapezoidal. In the following, the upper side of reinforcing cord 26 (the outer side in a tire diameter direction) is indicated as 26U, and the lower sider of reinforcing cord 26 (the inner side in a tire diameter direction) is indicated as 26D. Although reinforcing cord 26 has a sectional shape that is approximately trapezoidal in this embodiment, the disclosure is not limited thereto and reinforcing cord 26 may have any shape except a shape in which the width is broader at the upper side 26U than at the lower side 26D.

As shown in FIG. 2, since reinforcing cord 26 is disposed with an interval in a circumferential direction, there are spaces 28A between the adjacent portions of reinforcing cord 26. Therefore, the outer surface of reinforcing cord layer 28 has a concave-convex shape, and outer surface 17S of tire frame 17 also has a concave-convex shape.

At outer surface 17S of tire frame 17 (including a portion having a concave-convex shape), finely roughened texture 96 is formed and cushion rubber 29 is bonded thereto with a bonding agent. Cushion rubber 29 flows and fills finely roughened texture 96 at a portion in contact with reinforcing cord 26.

On cushion rubber 29 (the outer side of the tire), tread 30 as described above is bonded. Tread 30 has a tread pattern (not shown in the drawing) including plural grooves at a portion to be in contact with a road surface, like a conventional rubber tire.

In the following, a manufacturing method of the tire of the embodiment is explained.

(Tire Frame Forming Process)

First, a pair of tire frame halves, which are supported by a supporting ring formed of a thin metal material, are disposed to face each other. Then, a welding mold is disposed so as to contact the outer surface of the welding portion of the tire frame halves. The welding mold is configured such that it applies a predetermined pressure to a portion around the welding portion of the tire frame halves.

Then, a pressure is applied to a portion around the welding portion of the tire frame halves at a temperature higher than the melting point of the resin material used for the tire frame, whereby the welding portion is melted and the tire frame halves are thermally bonded, and tire frame 17 is formed.

In this process, the temperature of the resin material and the welding mold are controlled so that the value of orientation f of tire frame 17 becomes a desired value.

In this embodiment, the welding portion of the tire frame halves is heated by using a welding mold, but the disclosure is not limited thereto. For example, the heating may be performed by using a separate means such as a high-frequency heating apparatus. Further, the tire frame halves may be preliminarily softened or melted by hot-air blowing or infrared irradiation, and then bonded by applying a pressure with the welding mold.

(Reinforcing Cord Winding Process)

Figure 3:
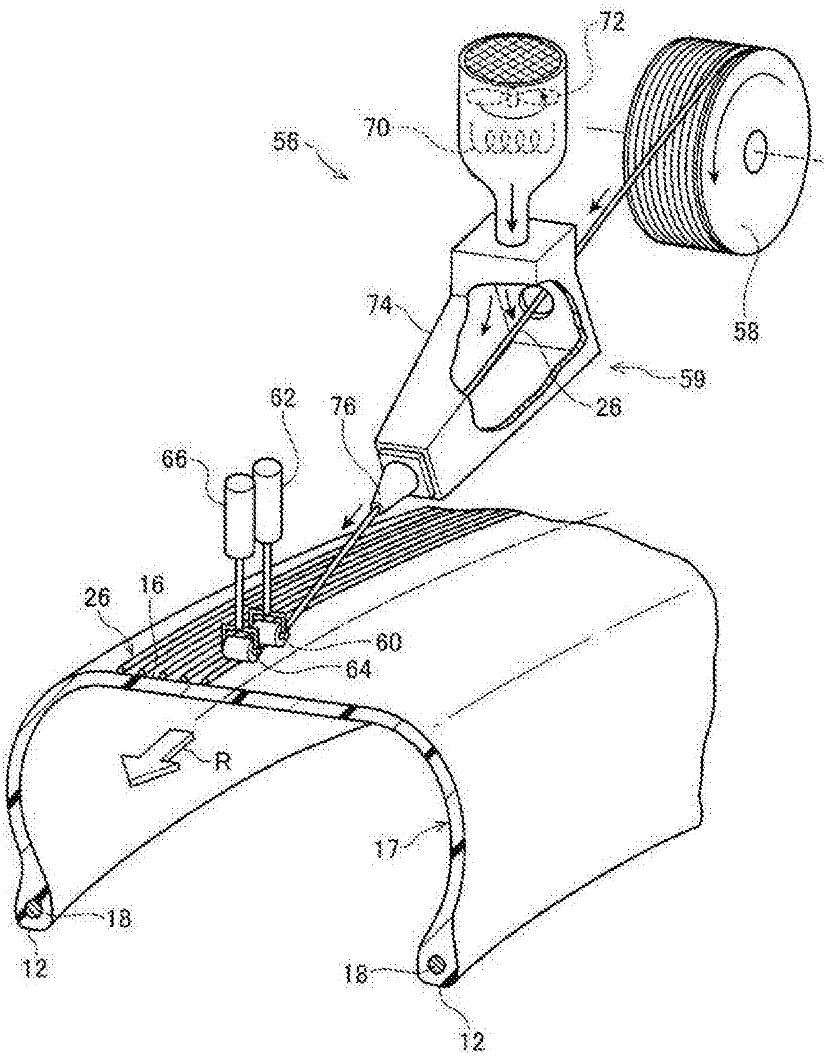
FIG. 3 is a drawing illustrating how a reinforcing cord is embedded in the crown portion using a cord heater and rollers.

Subsequently, a process in which reinforcing cord 26 is wound around tire frame 17 is explained by referring to FIG. 3. FIG. 3 is a drawing illustrating the operation of embedding reinforcing cord 26 in a crown portion of tire frame 17 with a cord heater and rollers.

In FIG. 3, cord supply apparatus 56 is equipped with reel 58 in which reinforcing cord 26 is reeled; cord heater 59 that is disposed downstream of a direction in which reinforcing cord 26 is delivered by reel 58; first roller 60 that is disposed downstream of a direction in which reinforcing cord 26 is delivered; first cylinder 62 that moves first roller 62 in a direction towards or away from the outer surface of the tire; second roller 64 that is disposed downstream of a direction in which reinforcing cord 26 is delivered by first roller 60; and second cylinder 66 that moves second roller 64 in a direction towards or away from the outer surface of the tire. Second roller 64 may be used as a cooling roller made of metal.

In this embodiment, the surface of first roller 60 and the surface of second roller 64 are subjected to treatment for avoiding attachment of molten or softened coating resin material 27 (for example, fluororesin-coating treatment). It is also possible to use a roller formed of a material to which coating resin material 27 is not likely to adhere.

Cord supply apparatus 56 may have either one of first roller 60 or second roller 64, although it is equipped with both of them in this embodiment.

Cord heater 59 is equipped with heater 70 and fan 72 for generating a hot wind. Further, cord heater 59 is equipped with heating box 74 having a space in which the generated hot wind is supplied and reinforcing cord 26 is passes, and outlet 76 from which reinforcing cord 26 that has been heated is discharged.

In this process, the temperature of heater 70 of cord heater 59 is increased and the air heated by heater 70 is delivered to heating box 74 with a wind created by the rotation of fan 27. Then, reinforcing cord 26 is reeled out from reel 58 and delivered to heating box 24, and heated. The temperature for the heating is adjusted so that coating resin material 27 of reinforcing cord 26 is melted or softened.

Reinforcing cord 26 that has been heated passes through outlet 76 and is wound around the crown portion 16 of tire frame, which is rotated in a direction indicated by R in FIG. 3, in a spiral manner while applying a constant tension. At this time, the lower surface 26D of reinforcing cord 26 contacts crown portion 16, and coating resin material 27 that is melted or softened by heating is spread on crown portion 16, whereby reinforcing cord 26 is bonded thereto. In this way, adhesion strength between drown portion 16 and reinforcing cord 26 is improved.

Although reinforcing cord 26 is bonded to crown portion 16 by a process as described above, the bonding may be performed by a different process. For example, the bonding may be performed such that reinforcing cord is partially or totally embedded in crown portion 16.

(Roughening Process)

Subsequently, blasting is performed with a blasting apparatus (now shown) by blasting the media against outer surface 17S of tire frame 17 at high speed while rotating tire frame 17. By performing blasting, fine roughness 96 is formed at outer surface 17S with an arithmetic average roughness Ra of 0.05 mm or more. By forming fine roughness 96 at outer surface 17S of tire frame 17, outer surface 17S becomes hydrophilic to increase wettability with respect to a bonding agent as described later.

(Layering Process)

Subsequently, a bonding agent for bonding cushion rubber 29 is applied on outer surface 17S of tire frame 17 that has been subjected to blasting. The type of the bonding agent is not particularly limited, and examples include triazine thiol adhesive, chlorinated rubber adhesive, phenol resin adhesive, isocyanate adhesive, halogenated rubber adhesive and rubber adhesive. The bonding agent is preferably a bonding agent that becomes reactive at a temperature at which cushion rubber 29 is vulcanized (90° C. to 140° C.).

Then, cushion rubber 29 that has not been vulcanized is wound around outer surface 17S of tire frame 17 that has been applied with a bonding agent. Further, a bonding agent such as a rubber cement composition is applied on cushion rubber 29. Then, tread rubber 30A that has been vulcanized or not yet vulcanized is wound around cushion rubber 29, thereby preparing a green tire frame.

(Vulcanizing Process)

Subsequently, the green tire frame is placed in a vulcanizing can or a mold, and vulcanized. During the process, cushion rubber 29 that has not been vulcanized flows and fills roughness 96 formed at outer surface 17S of tire frame 17. After the completion of vulcanization, cushion rubber 29 exhibits an anchoring effect to improve the adhesion strength between tire frame 17 and cushion 29, i.e., the adhesion strength between tire frame 17 and tread 30 is improved via cushion rubber 29.

During this process, the temperature and the time for the vulcanization are controlled so as to adjust the value of orientation f of tire frame 17 to be a desired value.

Then, sealing layer 24 as mentioned above is bonded to bead 12 of tire frame 17 with an adhesive or the like, and tire 10 is obtained.

The embodiments as mentioned above is described as one example, and may be modified in a various manner within the scope of the disclosure. It is also noted that the scope of the disclosure is not limited to the embodiments as mentioned above. For the details of the embodiments that are applicable to the disclosure, for example, the description of JP-A No. 2012-46031 may be of reference.

EXAMPLES

In the following, the disclosure is explained in further details with reference to the Examples. However, the disclosure is not limited to these Examples. Also, the Examples include prophetic Examples.

(Manufacturing of Tire)

The tires of the Examples and the Comparative Examples having a structure as described in the aforementioned embodiment were manufactured. As the resin material for forming a tire frame, a polyamide thermoplastic elastomer in which a hard segment is polyamide 12 and a soft segment is polyether (UBESTA XPA 9055, manufactured by Ube Industries, Ltd., melting point: 162° C.) was used.

In the preparation of the tire frame and the tire of Example 1, the temperature of the cylinder and the temperature of the mold during injection molding were 260° C. and 80° C., respectively, and the temperature and the time for heating for vulcanization were 150° C. and 20 minutes, respectively. These conditions were changed in the other Examples and the Comparative Examples in order to adjust the value of orientation f, the value of long period L and the degree of crystallinity Xc.

The reinforcing cord used for the tire was manufactured by the following process.

An adhesive layer was formed around a multi-filament cord (average diameter: 1.15 mm) formed from five mono-filaments (made of steel, average diameter: 0.35 mm, strength: 280 N, degree of elongation: 3%) by attaching an acid-modified polypropylene that was melted by heat. Then, the adhesive layer was covered with a polyamide thermoplastic elastomer (UBESTA XPA 9055, manufactured by Ube Industries, Ltd., melting point: 162° C.) that was extruded from an extruder, and cooled.

A sample was obtained from the tire frame of the tire, and the value of orientation f, the value of long period L, and the degree of crystallinity Xc of the polyamide thermoplastic elastomer were measured by the methods as mentioned above, respectively. The results are shown in Table 1.

(Evaluation of Durability)

The evaluation of durability of the tires manufactured in the Examples and the Comparative Examples was performed by a BF dram test as described below. The results are shown in Table 1.

(BF Dram Test)

A test tire (size: 195/65R15) was manufactured by the method as described above, and the inner pressure of the test tire was adjusted to 3.0 kg/cm$^2$ in a room at 25±2° C. 24 hours after the adjustment, the air pressure was adjusted again and the test tire was allowed to run on a drum having a diameter of approximately 3 m at a rate of 60 km/h for a distance of 20000 km, while applying a load of 540 kg. The test tire was evaluated by the following criteria. When the result is A, it is evaluated as favorable for use as a tire.

A: The test tire did not have damage such as cracking after the completion of the running.

B: The test tire did not complete the running, or had damage such as cracking after the completion of the running.

TABLE 1

| | Example 1 | Example 2 | Example 3 | Comparative Example 1 | Comparative Example 2 |
|---|---|---|---|---|---|
| Orientation f | 0.0037 | −0.05 | −0.08 | −0.082 | −0.1 |
| Long period L [nm] | 5 | 10 | 10.5 | 10.8 | 12 |
| Crystallinity Xc [%] | 12 | 35 | 37 | 38.2 | 45 |
| BF dram test | A | A | A | B | B |

As shown in Table 1, the tires of the Examples, in which the tire frame was formed of a thermoplastic elastomer with a value of orientation of −0.08 to 0.08, exhibited better results in durability than the tires of the Comparative Examples, in which the tire frame was formed of a thermoplastic elastomer not having a value of orientation of −0.08 to 0.08. These results show that the disclosure provides a tire that exhibits excellent durability.

The tire of the disclosure includes the following embodiments.

<1> A tire having a tire frame, the tire frame comprising a thermoplastic elastomer as a resin material, and the thermoplastic elastomer having a value of orientation f, as measured by a small angle X-ray scattering method, of from −0.08 to 0.08.

<2> The tire according to <1>, wherein the thermoplastic elastomer has a value of long period L, as measured by a small angle X-ray scattering method, of from 6 nm to 11 nm.

<3> The tire according to <1>, wherein the thermoplastic elastomer has a degree of crystallinity Xc, as measured by a wide angle X-ray scattering method, of from 12% to 45%.

<4> The tire according to <2>, wherein the thermoplastic elastomer has a degree of crystallinity Xc, as measured by a wide angle X-ray scattering method, of from 12% to 45%.

<5> The tire according to any one of <1> to <4>, wherein the thermoplastic elastomer comprises a polyamide thermoplastic elastomer.

Reference Examples

A tire was prepared and evaluated in a similar manner to Example 1, except that p-hydroxybenzoic acid ester was added as a plasticizer to the polyamide thermoplastic elastomer.

The type of the polyamide thermoplastic elastomer, the type and the weight-average molecular weight (Mw) of the plasticizer, the glass transition temperature (Tg) of the resin material, the amount of the plasticizer with respect to 100 parts by mass of the thermoplastic elastomer (parts by mass), and the evaluation results are shown in Table 2.

Details of the thermoplastic elastomer and the plasticizer as described in Table 2 are as follows.

Thermoplastic Elastomer 1 (UBESTA XPA 9055, Ube Industries, Ltd., a polyamide thermoplastic elastomer having an aliphatic polyamide component synthesized by ring-opening reaction)

Thermoplastic Elastomer 2 (prepared by the method as described below, a polyamide thermoplastic elastomer having an aliphatic polyamide component synthesized by copolymerization of diamine and dicarboxylic acid compound)

Plasticizer 1 (heptyl p-hydroxybenzoate, Tokyo Chemical Industry Co., Ltd.)

Plasticizer 2 (2-ethylhexyl p-hydroxybenzoate, Tokyo Chemical Industry Co., Ltd.)

Plasticizer 3 (methyl p-hydroxybenzoate, Tokyo Chemical Industry Co., Ltd.)

(Preparation of Thermoplastic Elastomer 2)

To a 2 L-reaction container equipped with a stirrer, a nitrogen gas feed port and a condensation water outlet, dodecanedioic acid (DDA) 68.2 g, hexamethylene diamine (HMDA) 1.8 g, PPG/PTMG/PPG (a polymer that forms a soft segment, triblock polyether diamine having an amino group at both ends, ELASTAMIN RT-1000, Huntsman Corporation) 280 g, purified water 150 g, and sodium hypophosphite 0.7 g were placed and mixed. The reaction container was nitrogen-substituted and the temperature was increased to 230° C. under the confining pressure. After the inner pressure reached 0.5 MPa, the pressure was gradually released and stirring was conducted for 5 hours at 230° C. under a nitrogen stream. A polyamide elastomer was thus obtained.

TABLE 2

| | Reference Examples | | | | | | | | | | | | | | | | | |
|---|---|---|---|---|---|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 | 1-13 | 1-14 | 1-15 | 1-16 | 1-17 | 1-18 |
| Thermoplastic Elastomer | 1 | 1 | 1 | 1 | 1 | 1 | 1 | 1 | 1 | 1 | 1 | 1 | 2 | 2 | 2 | 2 | 2 | 2 |
| Tg (° C.) | −7 | −14 | −21 | −28 | −35 | −42 | −7 | −14 | −20 | −27 | −34 | −41 | −4 | −13 | −22 | −4 | −13 | −22 |
| Plasticizer | 1 | 1 | 1 | 1 | 1 | 1 | 2 | 2 | 2 | 2 | 2 | 2 | 1 | 1 | 1 | 2 | 2 | 2 |
| Mw | 230 | 230 | 230 | 230 | 230 | 230 | 250 | 250 | 250 | 250 | 250 | 250 | 230 | 230 | 230 | 250 | 250 | 250 |
| Amount (parts by mass) | 5 | 10 | 15 | 20 | 25 | 30 | 5 | 10 | 15 | 20 | 25 | 30 | 20 | 25 | 30 | 20 | 25 | 30 |
| Volatility | A | A | A | A | A | A | A | A | A | A | A | A | A | A | A | A | A | A |
| RRC improvement | 112 | 124 | 135 | 146 | 158 | 169 | 109 | 118 | 127 | 137 | 146 | 156 | 111 | 120 | 129 | 111 | 120 | 129 |
| Adhesion | A | A | A | A | A | A | A | A | A | A | A | A | A | A | A | A | A | A |

| | Reference Examples | | | | | | | | | | | | | |
|---|---|---|---|---|---|---|---|---|---|---|---|---|---|---|
| | 2-1 | 2-2 | 2-3 | 2-4 | 2-5 | 2-6 | 2-7 | 2-8 | 2-9 | 2-10 | 2-11 | 2-12 | 2-13 | 2-14 |
| Thermoplastic Elastomer | 1 | 1 | 1 | 1 | 1 | 2 | 2 | 2 | 2 | 2 | 2 | 2 | 2 | 2 |
| Tg (° C.) | 0 | −16 | −33 | −49 | −47 | 33 | 23 | 14 | 5 | −32 | 23 | 14 | 5 | −32 |
| Plasticizer | — | 3 | 3 | 1 | 2 | — | 1 | 1 | 1 | 1 | 2 | 2 | 2 | 2 |
| Mw | — | 152 | 152 | 230 | 250 | — | 230 | 230 | 230 | 230 | 250 | 250 | 250 | 250 |
| Amount (parts by mass) | 0 | 10 | 20 | 35 | 35 | 0 | 5 | 10 | 15 | 35 | 5 | 10 | 15 | 35 |
| Volatility | A | B | B | A | A | A | A | A | A | A | A | A | A | A |
| RRC improvement | 100 | 133 | 165 | 181 | 165 | 100 | 100 | 100 | 100 | 138 | 100 | 100 | 100 | 138 |
| Adhesion | A | A | B | B | B | A | A | A | A | B | A | A | A | B |

<Glass Transition Temperature of Resin Material>

The glass transition temperature of the resin material was obtained by measuring the temperature dependency of tan δ (loss elastic modulus/storage elastic modulus), and a temperature at which a peak of tan δ was seen was used as the glass transition temperature. The measurement was conducted using ARES-G2 (TA Instruments Japan Inc.) under the conditions of input mode: torsion, frequency: 35 Hz and amount of distortion: 0.3%.

<Volatility>

The volatility of the plasticizer was evaluated by storing the resin material in a thermostat bath at 80° C. for 2 weeks, and evaluated by the following criteria.

A: The decrease rate in mass of the resin material before and after the storage was 0.5% or less.

B: The decrease rate in mass of the resin material before and after the storage was greater than 0.5%.

<RRC Improvement Effect>

The RRC (rolling resistance coefficient) was obtained by conducting the measurement of the distortion dependency of tan δ (loss elastic modulus/storage elastic modulus) twice in a consecutive manner. A value of tan δ at a distortion of 5% in the second measurement was used as the RRC. The measurement was conducted using ARES-G2 (TA Instruments Japan Inc.) under the conditions of input mode: torsion, temperature: 30° C. and frequency: 35 Hz.

The result of Reference Example 2-1 was defined as a standard value (100), and the obtained values were converted to a relative value based on the standard value.

<Adhesion>

Two test pieces (25 mm×150 mm×2.5 mm) were prepared and a RFL adhesive was applied on one surface of each piece with a brush. Then, unvulcanized 100% NR, a vulcanizing agent, a vulcanizing accelerator and rubber reagents were mixed with a Banbury mixer, and a rubber piece was prepared by forming the mixture to a thickness of 2.5 mm. Then, the rubber piece was sandwiched with the resin pieces with the side applied with the adhesive facing the rubber piece, thereby preparing a laminate. The laminate was subjected to a vulcanization process under a pressure maintained at 2 MPa, at 145° C. for 20 minutes, thereby preparing a test piece.

Subsequently, the resin pieces of the laminate were pulled by a method as defined in JIS-K 6854-3:1999 at a rate of 100 mm/minute, and a state of delamination from the rubber piece was evaluated by the following criteria.

A: The rubber piece was broken.

B: The breakage (delamination) occurred between the rubber piece and the resin pieces.

As shown in Table 2, the tires of Reference Examples 1-1 to 1-12, having a tire frame formed from a resin material in which Thermoplastic Elastomer 1 was used as the polyamide thermoplastic elastomer and a p-hydroxy benzoic acid ester compound having an alkyl chain with 5 to 8 carbon atoms was used as the plasticizer in an amount of 5 to 30 parts by mass with respect to 100 parts by mass of the polyamide thermoplastic elastomer, exhibited favorable tire properties and adhesion, as compared with Comparative Example 1 in which a plasticizer was not added.

The tires of Reference Examples 1-13 to 1-18, having a tire frame formed from a resin material in which Thermoplastic Elastomer 2 was used as the polyamide thermoplastic elastomer and a p-hydroxy benzoic acid ester compound having an alkyl chain with 5 to 8 carbon atoms was used as the plasticizer in an amount of 20 to 30 parts by mass with respect to 100 parts by mass of the polyamide thermoplastic elastomer, exhibited favorable tire properties and adhesion, as compared with Reference Example 2-6 in which a plasticizer was not added.

The tires of Reference Examples 2-2 and 2-3, in which a p-hydroxy benzoic acid ester compound having an alkyl chain with less than 5 carbon atoms was used as the plasticizer, exhibited favorable tire properties but was poor in the results of volatility.

The tires of Reference Examples 2-4, 2-5, 2-10 and 2-14, in which the amount of a plasticizer is over 30 parts by mass with respect to 100 parts by mass of the polyamide thermoplastic elastomer, exhibited favorable tire properties but was poor in the results of adhesion.

The tires of Reference Examples 2-7 to 2-9 and 2-11 to 2-13, in which Thermoplastic Elastomer 2 was used as the polyamide thermoplastic elastomer and the amount of the plasticizer was less than 20 parts by mass with respect to 100 parts by mass of the polyamide thermoplastic elastomer did not exhibit sufficient effect of improving the tire properties.

The invention claimed is:

1. A tire having a tire frame, the tire frame comprising a thermoplastic elastomer as a resin material, and the thermoplastic elastomer having a value of orientation f, as measured by a small angle X-ray scattering method, of from −0.08 to 0.08, wherein the thermoplastic elastomer has a value of long period L, as measured by a small angle X-ray scattering method, of from 6 nm to 11 nm, the thermoplastic elastomer has a degree of crystallinity Xc, as measured by a wide angle X-ray scattering method, of from 12% to 45%, and the thermoplastic elastomer comprises a polyamide thermoplastic elastomer.

* * * * *